United States Patent
Lueck et al.

(10) Patent No.: US 7,155,553 B2
(45) Date of Patent: Dec. 26, 2006

(54) PCI EXPRESS TO PCI TRANSLATION BRIDGE

(75) Inventors: Andrew W. Lueck, Plano, TX (US); Kevin K. Main, Plano, TX (US); Jeffrey H. Enoch, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 327 days.

(21) Appl. No.: 10/640,988

(22) Filed: Aug. 14, 2003

(65) Prior Publication Data

US 2005/0038947 A1 Feb. 17, 2005

(51) Int. Cl.
*G06F 13/14* (2006.01)

(52) U.S. Cl. .................. 710/305; 710/306; 710/240; 710/107

(58) Field of Classification Search .............. 710/107, 710/240–244, 305–306
See application file for complete search history.

(56) References Cited

U.S. PATENT DOCUMENTS

| | | | | |
|---|---|---|---|---|
| 6,199,132 | B1* | 3/2001 | Hewitt et al. ............... | 710/107 |
| 6,760,793 | B1* | 7/2004 | Kelley et al. ............... | 710/52 |
| 2002/0166007 | A1* | 11/2002 | Goudie ....................... | 710/52 |
| 2004/0013124 | A1* | 1/2004 | Peebles et al. ............. | 370/412 |
| 2004/0081158 | A1* | 4/2004 | Moll et al. ................ | 370/395.1 |
| 2004/0181617 | A1* | 9/2004 | Sauber ........................ | 710/20 |

OTHER PUBLICATIONS

PCI Express Base Specification, Rev. 1.0, Isochronous Applications, pp. 395-405.

PCI Express Base Specification, Rev. 1.0, Virtual Channel Capability, pp. 372-387.

PCI Express-SIG Developers Conference, Board Design Guidelines for PCI Express ™ Interconnect, Intel Corporation, pp. 1-4.

wysiwyg://fraContent.fraRightFrame.109/h.../hh/buses/1394-isoch_227b.asp?frame=true, MSDN Flash Newsletter, System Support for Buses: Windows DDK, Setting up Isochronous Transfer for IEEE 1394 Devices, Jul. 24, 2002, pp. 1-3.

wysiwyg://fraContent.fraRightFrame.120/h.../hh/buses/1394-isoch_2kkn.asp?frame=true, MSDN Flash Newsletter, System Support for Buses: Windows DDK, Isochronous I/O for IEEE 1394 Devices, Jul. 24, 2002, p. 1.

http://www.osr.com/ddk/buses/1394-isoch_74pz.htm, Completing an Isochronous Data Transfer, Sep. 5, 2002, p. 1.

wysiwyg://157/http://whatis.techtarget.com/definition/0,,sid9_gci748584,00.html, Whatis.com, IEEE 1394, Jun. 18, 2001, pp. 1-3.

* cited by examiner

*Primary Examiner*—Rehana Perveen
*Assistant Examiner*—Kim T. Huynh
(74) *Attorney, Agent, or Firm*—William B Kempler; W. James Brady; Frederick J. Telecky, Jr.

(57) ABSTRACT

A PCI Express to PCI bridge enables upstream and downstream isochronous data transfer by modifying the PCI bus arbiter so that the PCI device on the PCI bus is treated as a virtual port for the bridge. Data from the PCI device is assigned via a port arbitration table to sufficient bandwidth so that the data from the PCI device can be transferred upstream isochronously. The bridge also handles downstream isochronous data transfer.

18 Claims, 2 Drawing Sheets

PCI EXPRESS TO PCI TRANSLATION BRIDGE

FIELD OF THE INVENTION

This invention relates to a PCI Express to PCI bridge and more specifically to a bridge which can support isochronous traffic.

BACKGROUND OF THE INVENTION

Peripheral Component Interconnect (PCI) is a parallel bus architecture developed in 1992 which has become the predominant local bus for personal computers and similar platforms. The implementation of this technology has come close to its practical limits of performance and can not easily be scaled up in frequency or down in voltage. A new architecture utilizing point-to-point transmission, having a higher speed, and which is scalable for future improvements, is known as PCI Express.

One advantage of PCI Express is the ability to transfer isochronous data. The new IEEE Standard Dictionary of Electrical and Electronics Terms, fifth addition, defines "isochronous" as the time characteristic of an event or signal recurring at known, periodic time intervals. In terms of the architecture, transmission of isochronous data requires that the bus have a guaranteed minimum bandwidth and maximum latency in order to maintain the isochrony of the data. Video data is isochronous data because it is necessary that the frames of data arrive at a time certain or the data has no value.

A PCI Express to PCI bridge will allow PCI devices to be connected to a PCI bus in a PCI Express architecture. In a PCI bus architecture, the bus arbiter utilizes a round-robin arbitration which is "fair" to all devices on the bus. Once the device on the bus has received a grant to use the bus, it can hold on to the bus until its transaction is complete or until 4 kilobytes of data has been transferred, so that isochrony can not be guaranteed.

FIG. 1 shows a block diagram of a computer system 100 implementing a standard PCI Express to PCI bridge 112. The bridge is coupled by lines 108 to the PCI Express fabric (a network of interconnected devices and switches) 106, which is coupled by line 104 to CPU 102. The PCI Express fabric is also coupled via lines 110 to other devices (not shown). The PCI bus 114 is connected to the bridge and to two PCI applications 116, 120 respectively. Each of the applications has request/grant lines 118 and 122 respectively. PCI application 120 is isochronous and is connected via line 124 to an isochronous fabric, such as an IEEE 1394 device. Because of the way a PCI architecture operates, interfering traffic from the other PCI application will have equal priority and interfere with the isochronous transmission of data from the PCI application 120. Furthermore, PCI Express port traffic has its isochrony supported in the protocol, but all PCI bridge traffic is equally prioritized using virtual channel zero (VC0), both potentially losing the isochrony of data transmitted from PCI application 120.

SUMMARY OF THE INVENTION

It is a general object of the present invention to implement a PCI Express to PCI bridge that can transfer isochronous data.

This and other objects and features of the invention in accordance with one aspect of the invention includes a PCI Express to PCI bridge comprising a PCI interface couplable to a PCI bus having PCI compatible devices connected thereto. A port arbitration circuit controlling the PCI compatible devices to guarantee bandwidth to upstream data sent from a predetermined one of the PCI compatible devices and allocating the data to a predetermined one of a plurality of virtual cannels supported by PCI Express. A virtual channel arbitration circuit for allocating the virtual channels to an output port of the bridge. A PCI Express interface coupled between the virtual channel arbitration circuit and the output port.

A further aspect of the invention is provided by a method for isochronous transfer of data from a PCI compatible device connected to a PCI bus to a PCI Express fabric. Data is received at an input port for isochronous transfer from a preselected PCI compatible device. PCI compatible devices are controlled on the PCI bus to guarantee bandwidth from the preselected PCI device. Data from the preselected device is allocated to one of a plurality of virtual channels supported by PCI Express. The virtual channels are arbitrated onto an output port.

Another aspect of the invention comprises a method for isochronous transfer of data between a PCI compatible device and PCI Express fabric. Data from a PCI compatible device connected to a PCI bus is received, the data being addressed to a register defined in a PCI Express to PCI bridge. The data addressed to a register upstream is transferred to a PCI Express fabric, the data transfer maintaining isochrony of the data.

Yet another aspect of the invention is provided by a PCI Express to PCI bridge. First means receiving data from a PCI compatible device is connected to a PCI bus and sends the data upstream to a CPU via a PCI Express fabric, the first means maintaining isochrony of isochronous data from the PCI compatible device. Second means receives isochronous data from the CPU via the PCI Express fabric and for sends the data downstream to the PCI compatible device, the second means maintaining isochrony of the data.

DETAILED DESCRIPTION OF THE PRESENT INVENTION

Figure 1:
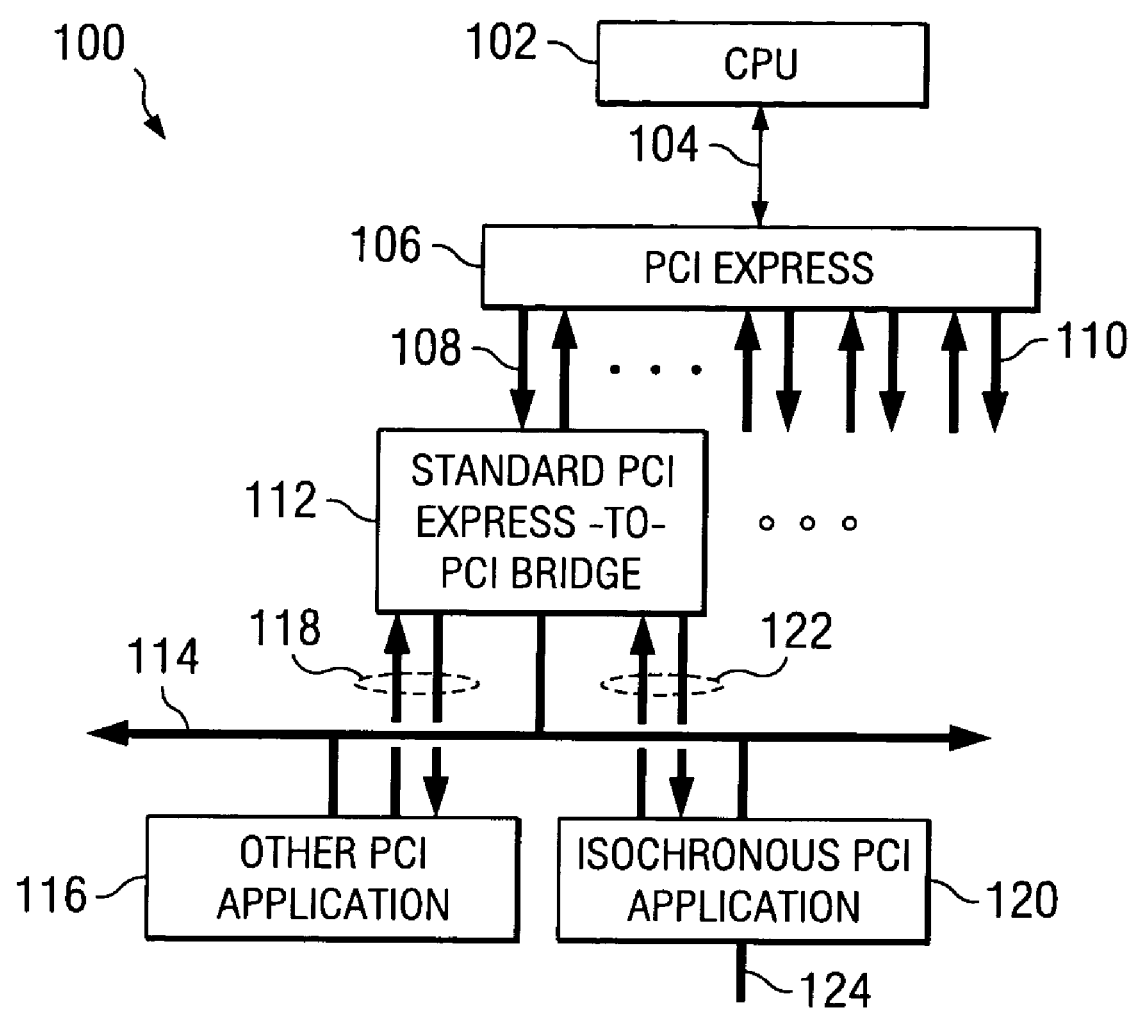
FIG. 1 is a bock diagram of a current implementation of a PCI Express to PCI bridge.
Figure 2:
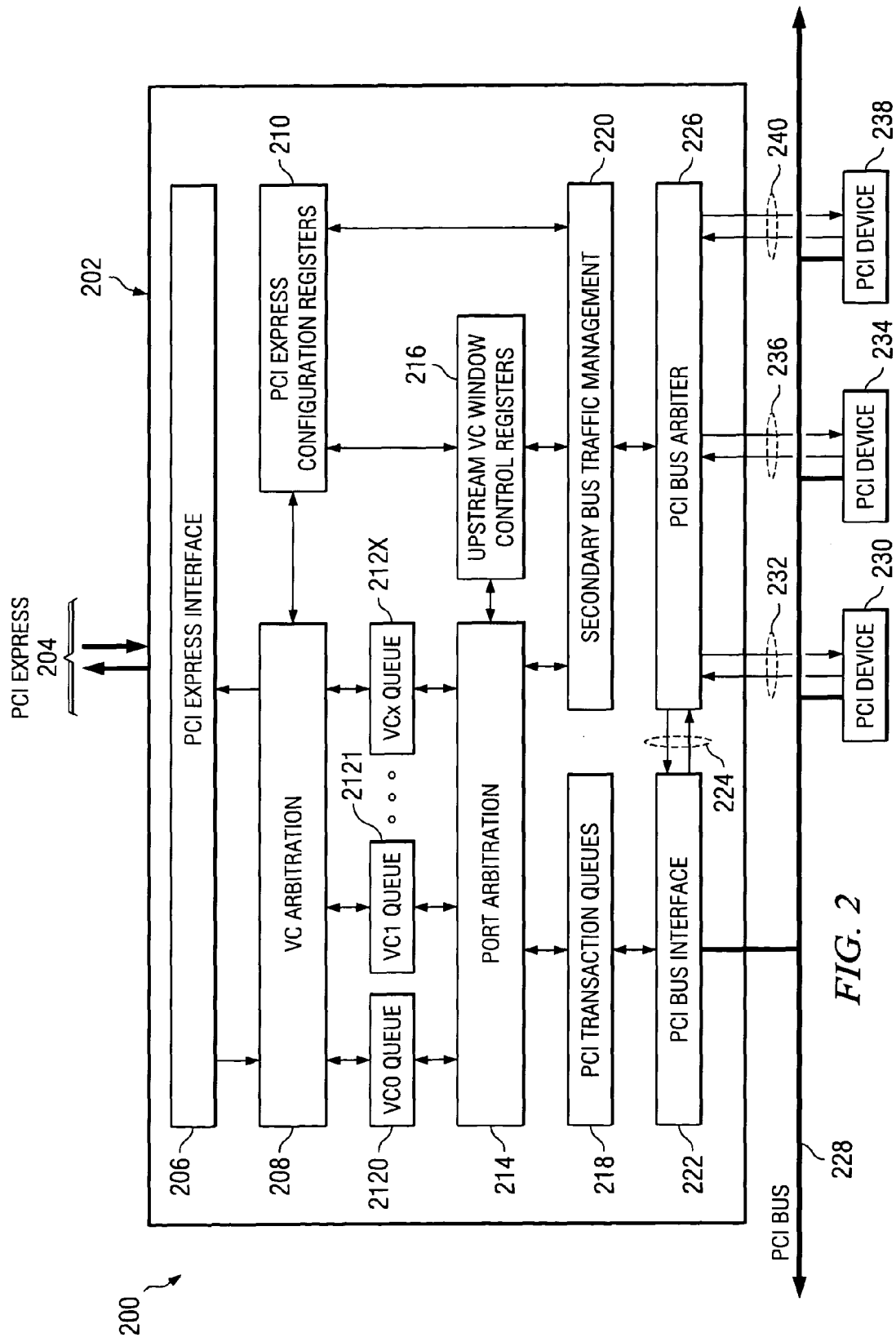
FIG. 2 is a bock diagram of a PCI Express to PCI bridge according to the present invention.

FIG. 2 shows a system 200 which utilizes a PCI Express to PCI bridge 202 according to the present invention. The bridge 202 is connected to a PCI Express fabric via lines 204 into a PCI Express interface 206. The PCI Express interface is connected to a virtual channel arbitration circuit 208 for both upstream and downstream data transfer. A plurality of queues VC0, VC1 . . . VCX are connected between the virtual channel arbitration circuit 208 and port arbitration circuit 214. The bridge can contain as many as eight virtual channels, and therefore there would be as many as eight virtual channel queues VC0 through VC7. The virtual channel arbitration circuit 208 is also connected for data transfer to PCI Express configuration registers 210. Upstream virtual channel window control registers 216 are connected to the PCI Express configuration registers 210 and to the port arbitration circuit 214 for a two way data transfer. A secondary bus traffic management circuit 220 is connected to upstream virtual channel window control registers 216, the port arbitration circuit 214 and the PCI Express configuration registers 210 for two way data transfer. The secondary bus traffic bus management circuit 220 is connected for two way data transfer to the PCI bus arbiter 226. The PCI bus arbiter is connected via request/grant lines 232, 236 and 240 to PCI devices 230, 234 and 238 respectively. Request/grant lines 224 couple a PCI bus interface 222 to the PCI bus arbiter 226 for two way data transfer. The PCI bus interface 222 is connected for two way data transfer to PCI transaction queues 218, which are also connected to the port arbitration circuit 214 for two way data transfer. The PCI bus interface 222 is connected to the PCI bus 228, which in turn is connected to the PCI devices 230, 234, 238.

The elements of the circuit shown in FIG. 2 are known from the PCI-Express Base Specification, revision 1.0, PCI-Express Translation Bridge Specification, revision 1.0, PCI-to-PCI Bridge Architecture Specification, revision 1.1 and PCI Local Bus Specification, revision 2.3, all of which are incorporated herein by reference. In order for a PCI device, for example device 238, to transfer data isochronously upstream, the device will address a register in the upstream VC window control registers which has been designated for isochronous transmission. The registers are configured by a program running on the host computer system. Physically, it is possible to place these registers within one of three areas of the bridge. Table 1 shows a PCI Express configuration register map for the traditional PCI configuration space which is compliant with the standard PCI-to-PCI bridge programming model. As can be seen from the map, there is not significant space available for these registers and what space is available is left for other tasks.

Table 2 shows the PCI Express extended configuration register map for PCI Express extended configuration space.

the bridge to now be configured for isochronous data transfer, which would then consume valuable processor time during the normal operation of the personal computer. If the registers are configured into memory space, they are addressed as a memory with an address and a read or write task.

Tables 1 and 2 show the register locations by an offset which is specified in hexadecimal notation. In Table 1, at offset 010h a "device controlled base address" is located. This base address is the starting address for the registers that are utilized that are utilized to indicate isochronous transfer, if the registers are to be placed in the standard or extended configuration space. The granularity of the base address is such that the mapped address has a boundary which accommodates only the number of bytes needed for this particular function. Table 3 is a device control memory window register map for the upstream VC window control registers 216 if the registers are to be placed in memory space. The map shows the configuration of four upstream isochronous window registers 0 through 3 and provides the offset address for each of the registers. The blocks below 38h-3Ch are used for all the functions and not involved in the present invention. The reserved section at location 38h-3Ch is to allow for additional registers.

TABLE 1

| Register Name | | | | Offset |
|---|---|---|---|---|
| Device ID | | Vendor ID | | 000h |
| Status | | Command | | 004h |
| | Class Code | | Revision ID | 008h |
| BIST | Header Type | Latency Timer | Cache Line Size | 00Ch |
| | Device Control Base Address | | | 010h |
| | Reserved | | | 014h |
| Secondary Latency Timer | Subordinate Bus Number | Secondary Bus Number | Primary Bus Number | 018h |
| Secondary Status | | I/O Limit | I/O Base | 01Ch |
| Memory Limit | | Memory Base | | 020h |
| Prefetchable Memory Limit | | Prefetchable Memory Base | | 024h |
| | Prefetchable Base Upper 32 Bits | | | 028h |
| | Prefetchable Limit Upper 32 Bits | | | 02Ch |
| I/O Limit Upper 16 Bits | | I/O Base Upper 16 Bits | | 030h |
| Reserved | | | Capabilities Pointer | 034h |
| | | Reserved | | 038h |
| Bridge Control | | Interrupt Pin | Interrupt Line | 03Ch |
| | Reserved | | | 040h–0FCh |

There appears to be room in this space for these registers, with a large space being available at the bottom of the map. However, the extended configuration space register map shown in Table 2 only supports a single virtual channel, VC1. The bridge can support up to 8 virtual channels, VC0 through VC7, however and this space is reserved for the port arbitration table for the additional virtual channels.

In the present invention, it was chosen to place the registers in memory, which provides several advantages. First of all, the amount of memory space that is provided is in addition to the spaces set up in the standards so that it is up to the designer to decide how much memory space will be available. Secondly, when one addresses the configuration spaces shown in Tables 1 and 2, if the predominant processor for personal computers is utilized in the host, I/O cycles are required to address this configuration space. These cycles lock down the processor making it wait for the completion of the task before proceeding to the next task. This wastes valuable processor time. It should further be noted that this time may not be taken at boot up of the system. For example, the user may hot plug in a IEEE 1394 device while the system is operating, for example, requiring

TABLE 2

| Register Name | | Offset |
|---|---|---|
| Next Capability Offset/ Capability Version | PCI Express Virtual Channel Extended Capabilities ID | 100h |
| Port VC Capability Register 1 | | 104h |
| Port VC Capability Register 2 | | 108h |
| Port VC Status Register | Port VC Control Register | 10Ch |
| VC Resource Capability Register (VC0) | | 110h |
| VC Resource Control Register (VC0) | | 114h |
| VC Resource Status Register (VC0) | Reserved | 118h |
| VC Resource Capability Register (VC1) | | 11Ch |
| VC Resource Control Register (VC1) | | 120h |
| VC Resource Status Register (VC1) | Reserved | 124h |
| Reserved | | 128h–12Ch |
| VC Arbitration Table (Phase 7–Phase 0) | | 130h |
| VC Arbitration Table (Phase 15–Phase 8) | | 134h |
| VC Arbitration Table (Phase 23–Phase 16) | | 138h |
| VC Arbitration Table (Phase 31–Phase 24) | | 13Ch |
| VC Arbitration Table Reserved | | 140h–16C |

TABLE 2-continued

| Register Name | Offset |
| --- | --- |
| Port Arbitration Table for VC1 (Phase 7–Phase 0) | 170h |
| Port Arbitration Table for VC1 (Phase 15–Phase 8) | 174h |
| Port Arbitration Table for VC1 (Phase 23–Phase 16) | 178h |
| Port Arbitration Table for VC1 (Phase 31–Phase 24) | 17Ch |
| Port Arbitration Table for VC1 (Phase 39–Phase 32) | 180h |
| Port Arbitration Table for VC1 (Phase 47–Phase 40) | 184h |
| Port Arbitration Table for VC1 (Phase 55–Phase 48) | 188h |
| Port Arbitration Table for VC1 (Phase 63–Phase 56) | 18Ch |
| Port Arbitration Table for VC1 (Phase 71–Phase 64) | 190h |
| Port Arbitration Table for VC1 (Phase 79–Phase 72) | 194h |
| Port Arbitration Table for VC1 (Phase 87–Phase 80) | 198h |
| Port Arbitration Table for VC1 (Phase 95–Phase 88) | 19Ch |
| Port Arbitration Table for VC1 (Phase 103–Phase 96) | 1A0h |
| Port Arbitration Table for VC1 (Phase 111–Phase 104) | 1A4h |
| Port Arbitration Table for VC1 (Phase 119–Phase 112) | 1A8h |
| Port Arbitration Table for VC1 (Phase 127–Phase 120) | 1ACh |
| Reserved | 1B0h–FFFh |

The registers within Table 3 are defined below with respect to Tables 4–15.

TABLE 3

| Register Name | | | Offset |
| --- | --- | --- | --- |
| Upstream Isochronous Capabilities | Revision ID | Device Control Map ID | 00h |

TABLE 3-continued

| Register Name | | Offset |
| --- | --- | --- |
| Upstream Isochronous Window Control | Upstream Isochronous Window Enable | 04h |
| Reserved | Upstream Isochronous Window 0 Control | 08h |
| Upstream Isochronous Window 0 Base Address | | 0Ch |
| Upstream Isochronous Window 0 Limit | | 10h |
| Reserved | Upstream Isochronous Window 1 Control | 14h |
| Upstream Isochronous Window 1 Base Address | | 18h |
| Upstream Isochronous Window 1 Limit | | 1Ch |
| Reserved | Upstream Isochronous Window 2 Control | 20h |
| Upstream Isochronous Window 2 Base Address | | 24h |
| Upstream Isochronous Window 2 Limit | | 28h |
| Reserved | Upstream Isochronous Window 3 Control | 2Ch |
| Upstream Isochronous Window 3 Base Address | | 30h |
| Upstream Isochronous Window 3 Limit | | 34h |

Table 4 shows the device control map ID register in which the value 01h identified the device as a PCI Express-to-PCI bridge supporting upstream isochronous capabilities.

TABLE 4

| | Bit Number | | | | | | | |
| --- | --- | --- | --- | --- | --- | --- | --- | --- |
| | 7 | 6 | 5 | 4 | 3 | 2 | 1 | 0 |
| Reset State | 0 | 0 | 0 | 0 | 0 | 0 | 0 | 1 |

Table 5 shows the revision ID register which identifies the revision of the layout of the device. The value 00h indicates that this is the initial layout definition.

TABLE 5

| | Bit Number | | | | | | | |
| --- | --- | --- | --- | --- | --- | --- | --- | --- |
| | 7 | 6 | 5 | 4 | 3 | 2 | 1 | 0 |
| Reset State | 0 | 0 | 0 | 0 | 0 | 0 | 0 | 0 |

Table 6 shows the upstream isochronous capabilities register which provides software information regarding the capabilities supported by the bridge.

TABLE 6

| | Bit Number | | | | | | | | | | | | | | | |
| --- | --- | --- | --- | --- | --- | --- | --- | --- | --- | --- | --- | --- | --- | --- | --- | --- |
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 1 | 0 | 0 |

Table 7 shows the bit description for the upstream isochronous capabilities register.

TABLE 7

| Bit | Field Name | Access | Description |
| --- | --- | --- | --- |
| 15:4 | RSVD | r | Reserved. Return zeros when read. |
| 3:0 | ISOC_WINDOW_COUNT | r | Isochronous Window Count. This 4-bit field is used to indicate the number of isochronous address windows supported. The value "0100" indicates that 4 separate windows are supported by the bridge. |

Table 8 shows the upstream isochronous window enable register which allows the software to activate and deactivate upstream decode windows defined for an upstream virtual channel.

TABLE 8

| | \multicolumn{16}{c}{Bit Number} |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |

Table 9 shows the bit descriptions for the upstream isochronous window enable register.

TABLE 9

| Bit | Field Name | Access | Description |
|---|---|---|---|
| 15:3 | RSVD | r | Reserved. Return zeros when read. |
| 2 | PORTARB_LEVEL_2_EN | rw | Port Arbitration Level 2 Enable. This bit is only valid is PORTARB_LEVEL_1_EN is set to '1', because this enhances the behavior enabled through the assertion of that bit. If PORTARB_LEVEL_1_EN is clear, this bit is read-only and returns zero when read.<br>0 - Arbiter behavior follows PORTARB_LEVEL_1_EN rules<br>1 - "Aggressive Mode". The arbiter will deliberately stop secondary bus masters in the middle of their transaction to guarantee that isochrony is preserved. |
| 1 | PORTARB_LEVEL_1_EN | rw | Port Arbitration Level 1 Enable.<br>0 - Arbiter behavior is controlled only by the arbiter control registers within the tradition PCI configuration space.<br>1 - Values programmed within the port arbitration tables for extended virtual channels impact the arbiter's decision to assert GNT# to any particular bus master. Programmed values within the arbiter control registers within the traditional PCI configuration space have no effect. Port numbers are analogous to GNT# terminal assignment. |
| 0 | ISOC_ENABLE | rw | Isochronous Enable. Global Enable bit for the upstream isochrounous capability of the bridge.<br>0 - Mapping of upstream traffic to VCs other than VC0 prohibitied<br>1 - Mapping of upstream traffic to VCs other than VC0 permitted |

Table 10 shows the upstream isochrony control register 35 which allows the software to control bridge isochronous behavior.

TABLE 10

| | \multicolumn{16}{c}{Bit Number} |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |

Table 11 contains a bit description for the upstream isochrony control register.

TABLE 11

| Bit | Field Name | Access | Description |
|---|---|---|---|
| 15:3 | RSVD | r | Reserved. Return zeros when read. |
| 2 | PORTARB_LEVEL_2_EN | rw | Port Arbitration Level 2 Enable. This bit is only valid is PORTARB_LEVEL_1_EN is set to '1', because this enhances the behavior enabled through the assertion of that bit. If PORTARB_LEVEL_1_EN is clear, this bit is read-only and returns zero when read.<br>0 - Arbiter behavior follows PORTARB_LEVEL_1_EN rules<br>1 - "Aggressive Mode". The arbiter will deliberately stop secondary bus masters in the middle of their transaction to guarantee that isochrony is preserved. |
| 1 | PORTARB_LEVEL_1_EN | rw | Port Arbitration Level 1 Enable.<br>0 - Arbiter behavior is controlled only by the arbiter control registers within the tradition PCI configuration space.<br>1 - Values programmed within the port arbitration tables for extended virtual channels impact the arbiter's decision to assert GNT# to any particular bus master. Programmed values within the arbiter control registers within the traditional PCI |

TABLE 11-continued

| Bit | Field Name | Access | Description |
|---|---|---|---|
| | | | configuration space have no effect. Port numbers are analogous to GNT# terminal assignment. |
| 0 | ISOC_ENABLE | rw | Isochronous Enable. Global Enable bit for the upstream isochrounous capability of the bridge.<br>0 - Mapping of upstream traffic to VCs other than VC0 prohibitied<br>1 - Mapping of upstream traffic to VCs other than VC0 permitted |

Table 12 shows the upstream isochronous window 0 control register which allows the software to identify the virtual channel associated with upstream transactions targeting memory addresses in the range defined by the window.

TABLE 12

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |

Table 13 shows the bit descriptions for the upstream isochronous window 0 control register.

TABLE 13

| Bit | Field Name | Access | Description |
|---|---|---|---|
| 15:3 | RSVD | r | Reserved. Return zeros when read. |
| 0 | VC_ID | rw | Virtual Channel ID. ID of the virtual channel that upstream transactions targeting the range defined by the associated window should be mapped to. |

Table 14 shows the upstream isochronous window 0 base address register which allows the software to configure the base address for the upstream isochronous window.

TABLE 14

| | Bit Number | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Reset State | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |

Table 15 is the upstream isochronous window 0 limit register which allows the software to configure the up address bound for this upstream isochronous window.

TABLE 15

| | Bit Number | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Reset State | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |

The registers for isochronous window 1, 2 and 3 follow the definitions of the similar registers that have already been described. The locations below 38h-3Ch are for other purposes and not relevant to the present invention. When a device, such as device 238 addresses a register in the upstream VC window control registers 216, as described above, it is treated as if it were a port, and not as a device attached to a parallel bus. Registers 216 control the secondary bus traffic management circuit 220 to operate from the port arbitration table shown in Table 16. Table 16 shows 128 phases, from phase 0 through phase 127, each of which consists of a 4 bit field. The present bridge can handle 6 downstream devices, devices 0–5, although only 3 devices, 230, 234 and 238 are illustrated. Table 17 describes the bits in port arbitration Table 16.

sufficient number of phases to guarantee the bandwidth required for the isochronous transmission. The circuit 220 modifies the operation of the PCI bus arbiter 226 such that a grant is provided to device 238 on request/grant lines 240 each time one of these phases has been assigned to that device. In standard PCI bus arbitration, once a device has the bus, it can hold on to the bus for enough time to transmit or receive 4 kilobytes of data. If this time exceeds the amount of time allowed because the port arbitration Table 16 has the next phase assigned to an isochronous device such as device 238, the PCI bus arbiter can utilize a stop function which is meant in PCI operation to stop a PCI device from sending further data because the PCI transaction queues are filled, to take back control of the bus so that the isochronous transmission can be guaranteed its needed bandwidth. Thus, the

TABLE 16

| Register Name | | | | | | | | Offset |
|---|---|---|---|---|---|---|---|---|
| Phase 7 | Phase 6 | Phase 5 | Phase 4 | Phase 3 | Phase 2 | Phase 1 | Phase 0 | 1B0h |
| Phase 15 | Phase 14 | Phase 13 | Phase 12 | Phase 11 | Phase 10 | Phase 9 | Phase 8 | 1B4h |
| Phase 23 | Phase 22 | Phase 21 | Phase 20 | Phase 19 | Phase 18 | Phase 17 | Phase 16 | 1B8h |
| Phase 31 | Phase 30 | Phase 29 | Phase 28 | Phase 27 | Phase 26 | Phase 25 | Phase 24 | 1BCh |
| Phase 39 | Phase 38 | Phase 37 | Phase 36 | Phase 35 | Phase 34 | Phase 33 | Phase 32 | 1C0h |
| Phase 47 | Phase 46 | Phase 45 | Phase 44 | Phase 43 | Phase 42 | Phase 41 | Phase 40 | 1C4h |
| Phase 55 | Phase 54 | Phase 53 | Phase 52 | Phase 51 | Phase 50 | Phase 49 | Phase 48 | 1C8h |
| Phase 63 | Phase 62 | Phase 61 | Phase 60 | Phase 59 | Phase 58 | Phase 57 | Phase 56 | 1CCh |
| Phase 71 | Phase 70 | Phase 69 | Phase 68 | Phase 67 | Phase 66 | Phase 65 | Phase 64 | 1D0h |
| Phase 79 | Phase 78 | Phase 77 | Phase 76 | Phase 75 | Phase 74 | Phase 73 | Phase 72 | 1D4h |
| Phase 87 | Phase 86 | Phase 85 | Phase 84 | Phase 83 | Phase 82 | Phase 81 | Phase 80 | 1D8h |
| Phase 95 | Phase 94 | Phase 93 | Phase 92 | Phase 91 | Phase 90 | Phase 89 | Phase 88 | 1DCh |
| Phase 103 | Phase 102 | Phase 101 | Phase 100 | Phase 99 | Phase 98 | Phase 97 | Phase 96 | 1E0h |
| Phase 111 | Phase 110 | Phase 109 | Phase 108 | Phase 107 | Phase 106 | Phase 105 | Phase 104 | 1E4h |
| Phase 119 | Phase 118 | Phase 117 | Phase 116 | Phase 115 | Phase 114 | Phase 113 | Phase 112 | 1E8h |
| Phase 127 | Phase 126 | Phase 125 | Phase 124 | Phase 123 | Phase 122 | Phase 121 | Phase 120 | 1ECh |

| | Bit Number | | | |
|---|---|---|---|---|
| | 3 | 2 | 1 | 0 |
| Reset State | 0 | 0 | 0 | 0 |

TABLE 17

| Bit Field Name | Access | Description |
|---|---|---|
| 3:0 PORT_SELECT | rw | Port Arbitration Select. This 4-bit field is used for software to identify the Port ID (secondary PCI device) that should be allocated this slot of arbitration bandwidth depending upon the port arbitration scheme enabled. |

The secondary bus traffic management circuit 220 assigns the device sending isochronous data, here device 238, to a isochronous device defined in the new registers 216 are managed by the circuit 220 controlling the arbiter 226 so that device 238 appears to be a virtual port, rather than a device hooked to a parallel bus. During each phase in which device 238 has been granted assess to the bus, it submits data along bus 228 through a standard PCI bus interface 222 into standard PCI transaction queues 218. The PCI bus arbiter 226 operates in a normal manner for PCI devices 230 and 234, which are not transmitting isochronous data. Once they have made a request on request/grant lines 232 or 236, respectively, they can be given access to the bus during unused phases in the port arbitration table, Table 16. It should be noted that the secondary bus traffic management circuit 220 can be built into the PCI bus arbiter 226, but is illustrated separately here to show the new function.

PCI Express provides for up to 8 virtual channels, VC0 through VC7, as illustrated by blocks 2120, 2121 ... 212X in FIG. 2. The virtual channel 0, VC0, is the default channel which is utilized for transmitting non-time critical data, such as configuration data. Table 2 shows at locations 1B0h through 1ECh a port arbitration table for a first virtual channel, VC1. As stated earlier, only a signal virtual channel is shown in the present implementation, although 6 more virtual-channels can be provided. The isochronous data from device 238 is assigned by port arbitration circuit 214 implementing the port arbitration table for virtual channel VC1 shown in Table 2 into the queue 2121 for this virtual channel. The data from device 238 is assigned enough phases in virtual channel 1 to assure the isochrony of the data that is being transmitted upstream to the processor.

The data in the various virtual channels must be arbitrated onto a single output port 204. This is accomplished by virtual channel arbitration circuit 208 using the instructions stored at locations 170h through 17Ch in Table 2. The data being transmitted via virtual channel 1, which contains the isochronous data, is arbitrated onto the port by circuit 208 in order to maintain the isochrony of the data. This data is then passed to a standard PCI Express interface 206 and on to the PCI Express fabric 204. The data then progresses along PCI Express fabric 204 to the host processor (not shown).

When isochronous data is to be sent from the PCI Express fabric through port 204 downstream to a PCI device, such as device 238, a reverse process is applied. The reverse process is somewhat easier because PCI Express provides specifically for the transmission of isochronous data. The data is received on lines 204 and passes through PCI interface 206 into the virtual channel arbitration circuit 208. The virtual channel arbitration circuit 208 places the data in virtual channel 1, queue 2121, for example. This data then passes through port arbitration circuit 214 and into PCI transaction queues 218. The port arbitration circuit 214 signals the secondary bus traffic management circuit 220 to take possession of the bus in order that the isochronous data be transferred to the device 238. The secondary bus traffic management circuit 220 controls the PCI bus arbiter 226 to take control of the bus by sending a grant signal via request/grant lines 224 to the PCI bus interface 222. Once the bus is under the control of the bridge, the data can be transferred from the PCI transaction queues to the bus 228 and thus to device 238.

The registers 216 are configured by the host processor which run software within the host to set the resources within the bridge that are needed for a particular transaction. Thus, if a user were to hot plug in a isochronous device, such as an IEEE 1394 device, the host processor would then configure the registers 216 in order to provide the ability to transfer isochronous data through the bridge. These configuration commands would come through the PCI Express fabric into port 204 through the PCI Express interface 206 and the virtual channel arbitration circuit 208 into the PCI Express configuration registers 210 and then into the upstream virtual channel window control registers 216.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. A PCI to a serial switched topology used to connect peripheral devices to a computer bridge comprising:
   a PCI interface couplable to a PCI bus having PCI compatible devices connected thereto;
   a port arbitration circuit for controlling grant and stop lines of the PCI compatible devices to force time—based arbitration on the PCI devices connected to a PCI bus to guarantee bandwidth to upstream data sent from a predetermined one of the PCI compatible devices and for allocating the data to a predetermined one of a plurality of virtual cannels supported by a serial switched topology used to connect peripheral devices to a computer,
   a virtual channel arbitration circuit for allocating the virtual channels to an output port of the bridge; and
   the serial switched topology interface coupled between the virtual channel arbitration circuit and the output port.

2. The bridge of claim 1 further comprising a port arbitration table coupled to the port arbitration circuit, the port arbitration circuit, the port arbitration table determining PCI bus transactions to guarantee isochronism of data transfers.

3. The bridge of claim 2 further comprising a bus traffic management circuit responsive to the control data stored in the port arbitration table for controlling the port arbitration circuit.

4. The bridge of claim 1 further comprising a PCI bus arbiter circuit couplable to a PCI bus for controlling access by PCI compatible devices to the PCI bus.

5. The bridge of claim 3 further comprising a PCI bus arbiter circuit couplable to a PCI bus for controlling access by PCI compatible devices to the PCI bus.

6. The bridge of claim 5 wherein the PCI bus arbiter grants control of the PCI bus to a PCI compatible device connected to the bus, the PCI bus arbiter being controlled by the bus traffic management circuit to grant control of the PCI bus to a PCI compatible device sending isochronous data at predetermined intervals to maintain the isochronism of the data.

7. The bridge of claim 1 further comprising an upstream virtual channel window control register, the register being addressed by a PCI compatible device for sending isochronous data.

8. The bridge of claim 7 wherein the window control register is located within the serial switched topology configuration space.

9. The bridge of claim 7 wherein the window control register is located within extended PCI configuration space.

10. The bridge of claim 7 wherein the window control register is located in memory.

11. The bridge of claim 10 wherein the memory is located within the bridge.

12. The bridge of claim 11 wherein the memory is located in memory mapped configuration space.

13. The bridge of claim 1 further comprising a virtual channel arbitration circuit.

14. The bridge of claim 1 wherein the upstream data is isochronous data.

15. The bridge of claim 14 wherein the PCI compatible device is an IEEE 1394 device.

16. A method for isochronous transfer of data from a PCI compatible device connected to a PCI bus to a serial switched topology used to connect peripheral devices to a computer comprising:

receiving data at an input port for isochronous transfer from a preselected PCI compatible device;

controlling grant and stop lines of PCI compatible devices on the PCI bus to force time-based arbitration on the PCI devices connected to the PCI bus to guarantee bandwidth from the pre-selected PCI device;

allocating the data from the pre-selected device to one of a plurality of virtual channels supported by the serial switched topology;

arbitrating the virtual channels onto an output port.

17. The method of claim 16 wherein controlling PCI compatible devices on the PCI bus is in response to control signals generated in response to a port arbitration table.

18. The method of claim 16 further comprising:

writing data from a PCI compatible device to a register defined in a PCI to the serial switched topology bridge to define the data transfer as isochronous.

\* \* \* \* \*